(12) United States Patent
Kameda et al.

(10) Patent No.: US 7,742,259 B2
(45) Date of Patent: Jun. 22, 2010

(54) PERPENDICULAR MAGNETIC RECORDING HEAD CAPABLE OF SUPPRESSING PTP AND OBTAINING STABILIZED RECORDING MEDIUM AND METHOD OF MANUFACTURING THE SAME

(75) Inventors: Hiroshi Kameda, Niigaka-ken (JP); Kiyoshi Kobayashi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 678 days.

(21) Appl. No.: 11/676,139

(22) Filed: Feb. 16, 2007

(65) Prior Publication Data

US 2007/0195456 A1 Aug. 23, 2007

(30) Foreign Application Priority Data

Feb. 17, 2006 (JP) .............................. 2006-040539

(51) Int. Cl.
*G11B 5/39* (2006.01)
(52) U.S. Cl. ..................................................... 360/126
(58) Field of Classification Search ........................ None
See application file for complete search history.

(56) References Cited

U.S. PATENT DOCUMENTS

| 6,560,076 B1 * | 5/2003 | Yazawa et al. ............... 360/317 |
| 6,950,277 B1 * | 9/2005 | Nguy et al. ............ 360/125.14 |
| 7,436,628 B2 * | 10/2008 | Kameda et al. .......... 360/125.1 |
| 2002/0036871 A1 | 3/2002 | Yano et al. |
| 2004/0228030 A1 | 11/2004 | Mochizuki et al. |
| 2005/0141142 A1 | 6/2005 | Mochizuki et al. |

FOREIGN PATENT DOCUMENTS

| JP | 2002-100006 | 4/2002 |
| JP | 2004-342164 | 12/2004 |
| JP | 205-122831 | 5/2005 |
| JP | 2005-190515 | 7/2005 |
| JP | 2006-318579 | 11/2006 |

OTHER PUBLICATIONS

Office Action issued in corresponding Japanese Patent Application No. 2006-040539; issued Sep. 9, 2008.

* cited by examiner

*Primary Examiner*—Mark Blouin
(74) *Attorney, Agent, or Firm*—Brinks Hofer Gilson & Lione

(57) ABSTRACT

Particularly, there is provided a perpendicular magnetic recording head capable of suppressing PTP and obtaining a stabilized recording ability by improving the shape of the opposed surface of a return yoke layer and a method of manufacturing the same. The shape of the return yoke layer on the opposed surface includes a downside formed linearly parallel to a track width direction (X direction shown in the drawing), a center portion where a protrusion portion having a maximum width T1 larger than a track width Tw by protruding upwardly is formed in a position opposed to a main magnetic pole layer in a film thickness direction (Z direction shown in the drawing), and opposed end portions, having a film thickness smaller than the center portion, that extend on the opposite sides in the track width direction of the center portion. As a result, it is possible to properly obtain both effects such as the improvement of the recording ability and the suppressing of PTP generation.

5 Claims, 10 Drawing Sheets

FIG. 3
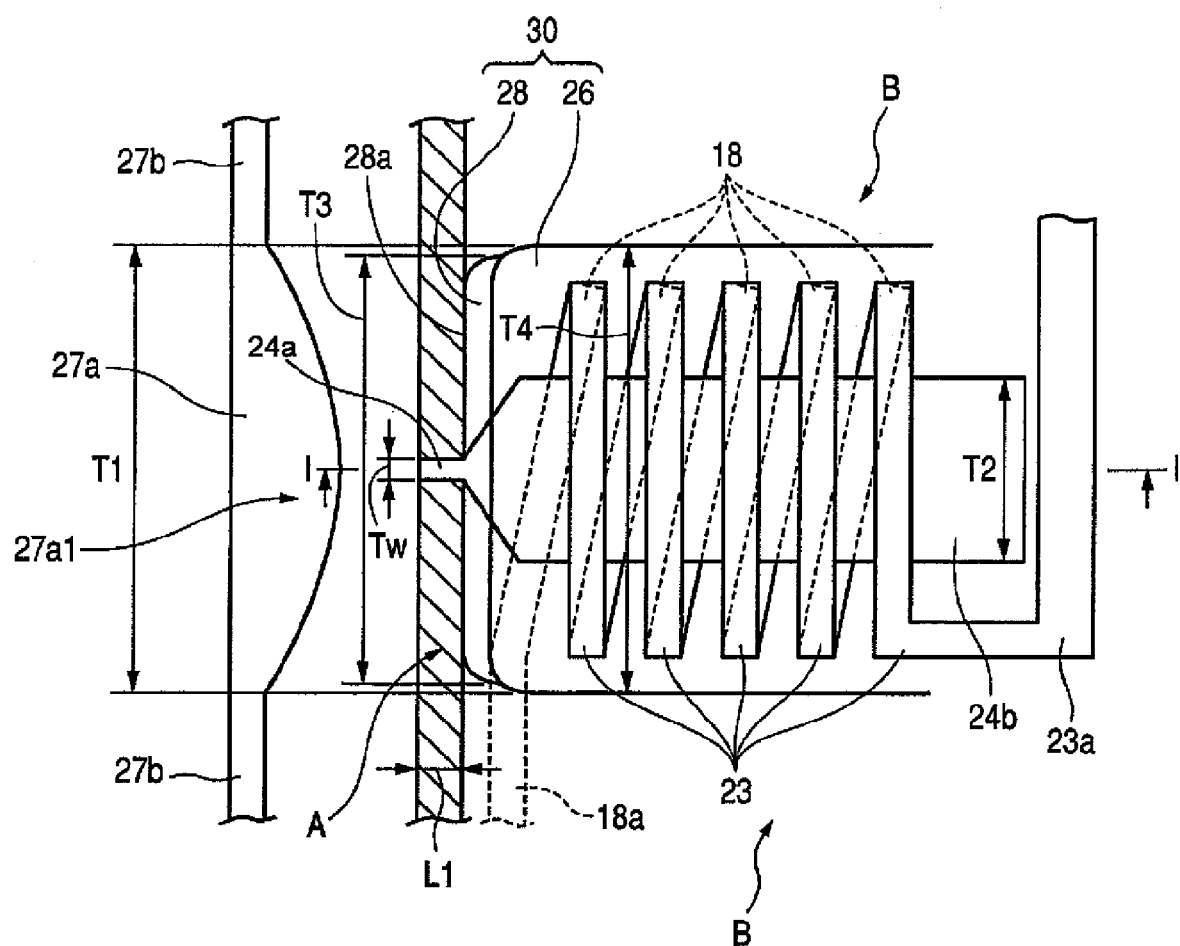
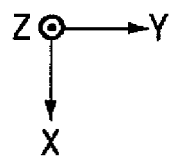

PERPENDICULAR MAGNETIC RECORDING HEAD CAPABLE OF SUPPRESSING PTP AND OBTAINING STABILIZED RECORDING MEDIUM AND METHOD OF MANUFACTURING THE SAME

This application claims the benefit of Japanese Patent Application No. 2006-040539 filed Feb. 17, 2006, which is hereby incorporated by reference.

TECHNICAL FIELD

The present invention relates to a perpendicular magnetic recording head that performs a recording operation by applying a magnetic field perpendicularly to a surface of a recording medium such as a disk, and more particularly, a perpendicular magnetic recording head capable of suppressing PTP (Pol Tip Protrusion) and obtaining a stabilized recording ability and a method of manufacturing the same.

BACKGROUND

A perpendicular magnetic recording head includes a main magnetic pole (for example, a main magnetic pole (35) described in Patent Document 1) and a return yoke layer (for example, a sub-magnetic pole (34) described in Patent Document 1), and a coil layer (for example, an excitation coil (36) described in Patent Document 1) as described in patent documents described below.

For example, FIG. 5 of Patent Document 1 is a front view of each magnetic layer as viewed from the opposed surface of a recording medium. As shown in FIG. 5 of Patent Document 1, the area in the opposed surface of the main magnetic pole layer is even smaller than the area in the opposed surface of the return yoke layer. As a result, a leakage recording magnetic field is concentrated on a front end of the main magnetic pole layer and the recording media is perpendicularly magnetized by the concentrated magnetic flux. Therefore, magnetic data is recorded. The magnetic flux returns to the return yoke layer after passing through the recording medium.

[Patent Document 1] JP-A-2002-100006 (US2002036871A1)

[Patent Document 2] JP-A-2005190515 (US2005141142A1)

[Patent Document 1] JP-A-2004-342164 (US2004228030A1)

However, when the temperature in the perpendicular magnetic recording head rises at the time of a recording operation, the return yoke layer, occupying a formation region still larger than other parts, easily is projected from the opposed surface. This is due to the difference in a thermal expansion coefficient from an insulating material in the vicinity of the return yoke layer. Consequently, a phenomenon called PTP (Pole Tip Protrusion) is generated.

Accordingly, thickness of the return yoke layer may be thinned to suppress the PTP.

However, if the thickness of the return yoke layer is thinned and the area of the return yoke layer exposed to the opposed surface becomes smaller, the return hole of the magnetic flux generated in the main magnetic pole layer becomes smaller. Particularly, the vicinity of a region opposed to the main magnetic pole layer in a film thickness direction easily reaches magnetic saturation, thereby reducing a recording ability.

The patent documents described above do not disclose the problems of generation of PTP and the reduction of the recording ability. Accordingly, the patent documents do not disclose solutions for suppressing the generation of the PTP and avoiding reduction of the recording ability.

Patent Document 3 described above relates to a shield layer used in the perpendicular magnetic recording head and discloses the invention in which a convex portion is provided toward the main magnetic pole layer. As a result, it is possible to remedy the curvature of a magnetization reversal form of a recording bit cell. (Paragraph [0032] of Patent Document 3).

However, Patent Document 3 discloses the invention relating to the shield layer as described above. In Patent Document 3, the shape of the return yoke layer is not improved. If the shield layer serves as the return yoke layer, the convex portion can protrude to the main magnetic pole layer. Accordingly, because the magnetic flux, which returns to the return yoke layer, is concentrated on the convex portion (that is, it is difficult that the magnetic flux returns to the return yoke layer to be properly dispersed) the convex portion may reach the magnetic saturation easily. In Patent Document 3 described above, because the width of the convex portion is smaller than the width of the main magnetic pole layer as shown in FIG. 5, the convex portion has a shape to reach the magnetic saturation more easily. Furthermore, in Patent Document 3, even if the convex portion is formed toward a lower side, it is very difficult to form the convex toward the lower side. In Patent Document 3, because an angle portion is formed in the convex portion, the magnetic flux leaks from the angle portion to the recording medium at the time of a nonrecording operation, thereby causing a problem such as an erasure of data recorded in the recording medium. As described above in regards to the invention of Patent Document 3, it may be impossible to suppress the generation of the PTP and avoid the reduction of the recording ability.

SUMMARY

According to an exemplary embodiment, a perpendicular magnetic recording head comprises a first magnetic layer having a main magnetic pole exposed from a surface opposed to a recording medium in a track width Tw. A return yoke layer is opposed to the first magnetic layer with a nonmagnetic layer interposed therebetween on the opposed surface. The perpendicular magnetic recording head also comprises a coil layer for applying a recording magnetic field to the first magnetic layer and the return yoke layer. The shape of the return yoke layer on the opposed surface includes a downside formed linearly parallel to the track width direction, a center portion, which includes a protrusion portion protruding upwardly and having a maximum width T1 larger than the track width Tw, is provided in a position opposed to the first magnetic layer in a film thickness direction, and opposed end portions extending on opposite sides in the track width direction of the center portion and having a film thickness smaller than the center portion.

In the perpendicular magnetic recording head according to the exemplary embodiment, an insulating layer having at least a coil insulating layer covering the coil layer, which protrudes upwardly, is provided in the rear of the opposed surface in a height direction between the first magnetic layer and the return yoke layer. The top surface of the nonmagnetic layer is formed as a planarized plane in a front region from the front edge of the insulating layer to the opposed surface. The protrusion portion of the return yoke layer is formed from the insulating layer to the front region. The bottom surface of the return yoke layer is formed as the planarized plane and the thickness of the center portion is larger than the film thicknesses of the opposed end portions at least in the front region.

In the perpendicular magnetic recording head according to the exemplary embodiment, the maximum width T1 of the protrusion portion is larger than the maximum width of the first magnetic layer.

In the perpendicular magnetic recording head according to the exemplary embodiment, the upside of the protrusion portion on the opposed surface has a curved shape.

According to another aspect of the exemplary embodiment, a method of manufacturing a perpendicular magnetic recording head including a first magnetic layer having a main magnetic pole exposed from a surface opposed to a recording medium in a track width Tw, a return yoke layer opposed to the first magnetic layer with a nonmagnetic layer interposed therebetween, and a coil layer for applying a recording magnetic field to the first magnetic layer and the return yoke layer includes steps (a), (b), and (c). Step (a) is forming the nonmagnetic layer on the first magnetic layer and forming the coil layer. Step (b) is protruding the insulating layer, including at least a coil insulating layer covering the coil layer, upwardly on the nonmagnetic layer and retreating the insulating layer in a height direction, wherein a protrusion is formed in a center portion of the return yoke layer, a gap L1 between the anterior of the insulating layer and the opposed surface is adjusted so that the film thickness in the center portion of the return yoke layer is larger than the film thickness in opposite sides formed in the track width direction of the center portion in a front region of the insulating layer, and the front region where the top surface of the nonmagnetic layer is exposed in a planarized plane is formed in the front of the insulating layer. Step (c) is exposing the return yoke layer by forming the return yoke layer through the insulating layer from the front region, wherein the return yoke layer includes a downside formed linearly parallel to the track width direction from the opposed surface, a center portion including a protrusion portion protruding upwardly having a maximum width T1 larger than the track width Tw is provided in a position opposed to the first magnetic layer in the film thickness direction, and opposed end portions, having the film thickness smaller than the center portion, that extend on the opposite sides in the track width direction of the center portion.

Other systems, methods, features, and advantages of the invention will be, or will become, apparent to one with skill in the art upon examination of the following figures and detailed description. It is intended that all such additional systems, methods, features, and advantages be included within this description.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

FIG. 3 is a fragmentary plan view of the perpendicular magnetic recording head and a fragmentary front view of a return yoke layer shown in FIG. 1.

DETAILED DESCRIPTION

Figure 1:
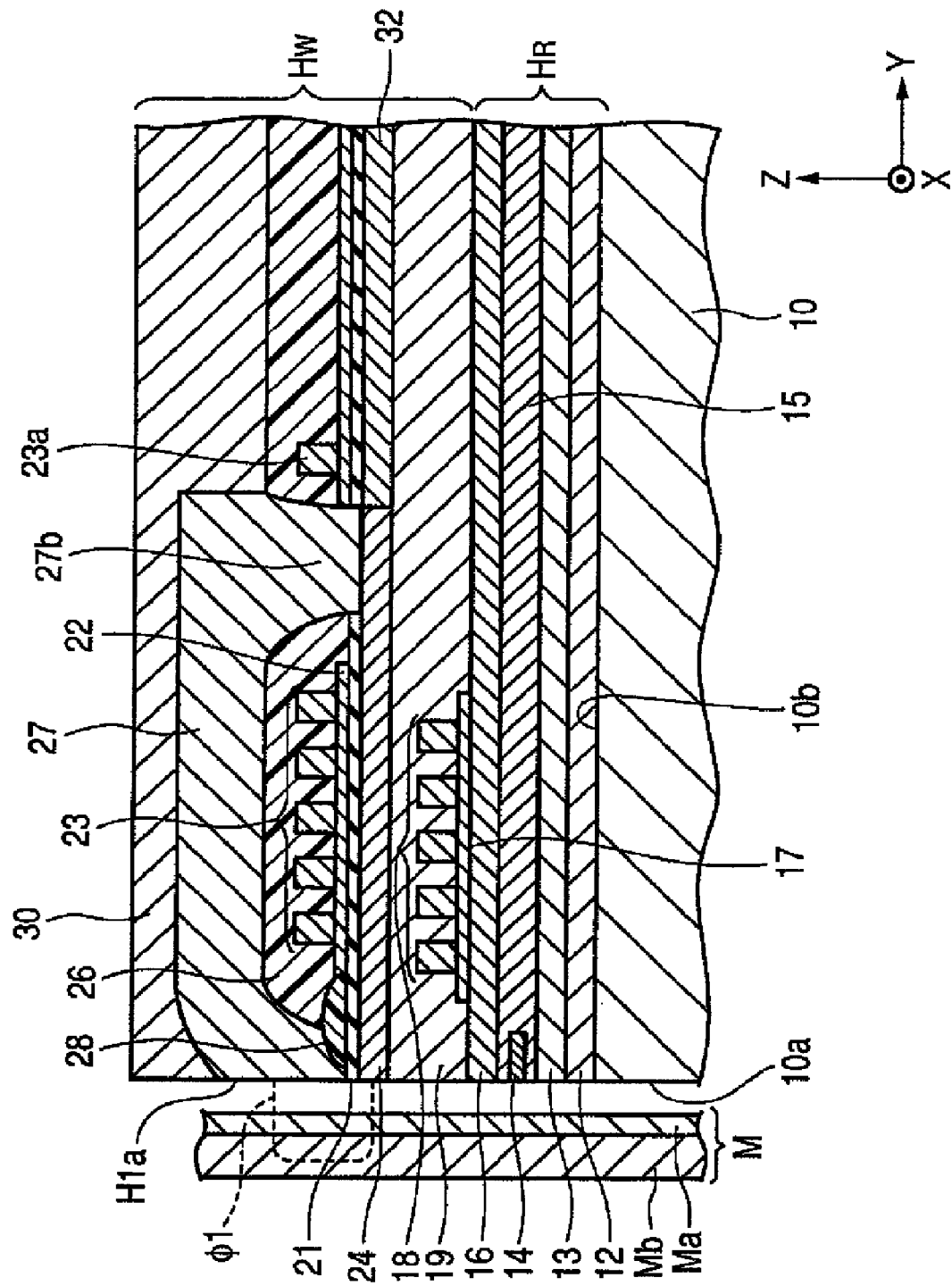
FIG. 1 is a fragmentary vertical cross-sectional view of a magnetic head including a perpendicular magnetic recording head according to a first exemplary embodiment (a cross section viewed from a plane parallel to a section Y-Z shown in FIG. 1).
Figure 2:
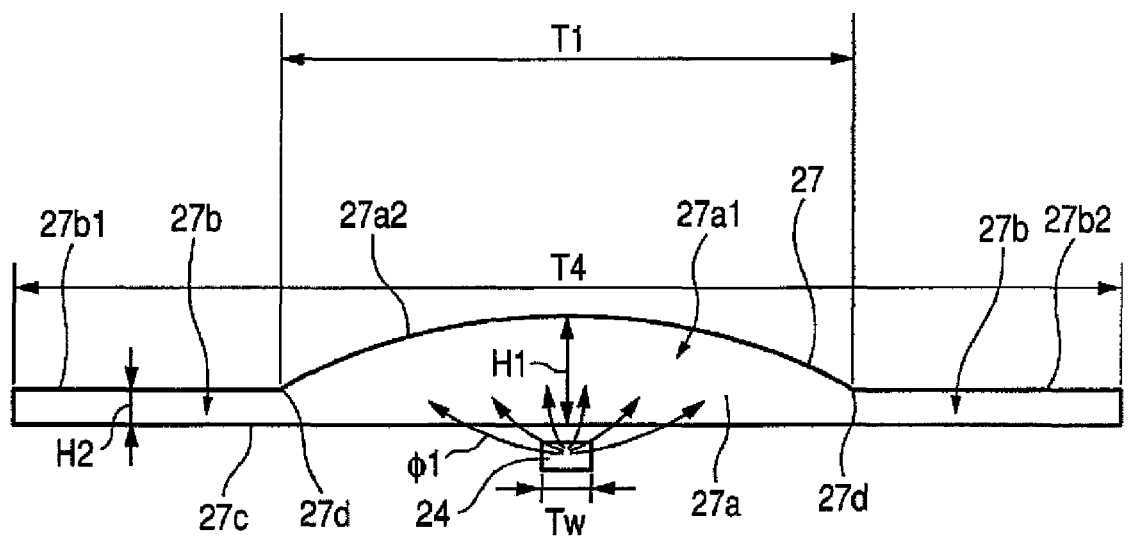
FIG. 2 is a fragmentary front view of the perpendicular magnetic recording head shown in FIG. 1 as viewed from the opposed surface of a recording medium.
Figure 4:
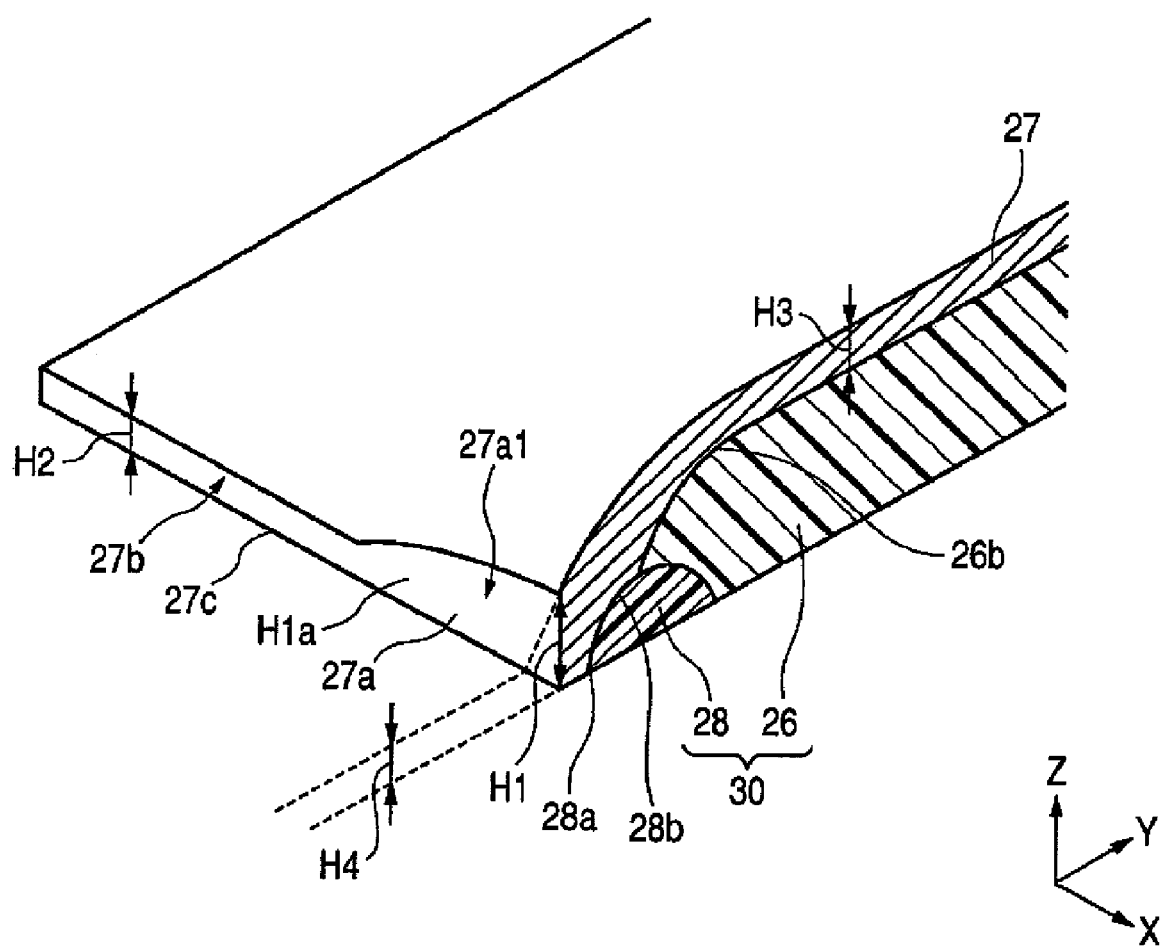
FIG. 4 is a fragmentary perspective view of the perpendicular magnetic recording head shown in FIG. 1.

FIG. 1 is a fragmentary cross-sectional view of a magnetic head including a perpendicular magnetic recording head according to a first embodiment (a cross-sectional view in a direction indicated by an arrow as viewed from a plane parallel to a section Y-Z shown in FIG. 1 taken along line I-I shown in FIG. 3). FIG. 2 is a fragmentary front view of the perpendicular magnetic recording head shown in FIG. 1 as viewed from the opposed surface of a recording medium. FIG. 3 is a fragmentary plan view of the perpendicular magnetic recording head and a fragmentary front view of a return yoke layer shown in FIG. 1. FIG. 4 is a fragmentary perspective view of the perpendicular magnetic recording head shown in FIG. 1.

An X direction shown in the drawing represents a track width direction, a Y direction shown in the drawing represents a height direction, and a Z direction shown in the drawing represents a film thickness direction. Each direction is orthogonal to the other two directions.

The perpendicular magnetic recording head Hw shown in FIG. 1 magnetizes the hard film Ma of the recording medium M perpendicularly by applying a perpendicular magnetic field to the recording medium M.

The recording medium M having a disk shape includes a hard film Ma having remanent magnetization and a soft film Mb having high magnetic permeability.

A slider 10 is formed of nonmagnetic materials such as $Al_2O_3$ and $SiO_2$. An opposed surface 10a of the slider 10 is opposed to the recording medium M. The slider 10 is levitated from the surface of the recording medium M, or the slider 10 slides to the recording medium M by the airflow of the surface when the recording medium M rotates.

A nonmagnetic insulating layer 12 formed of an inorganic material such as $Al_2O_3$ or $SiO_2$ is provided on the trailing end face (top surface) 10b of the slider 10. A reading unit $H_R$ is provided on the nonmagnetic insulating layer 12.

The reading unit $H_R$ includes a lower shield layer 13, an upper shield layer 16, and a reading element 14 in an inorganic insulating layer (gap insulating layer) 15 disposed between the lower shield layer 13 and the upper shield layer 16. The reading element 14 may be a magneto-resistance effect element, such as AMR, GMR, and TMR.

A plurality of lower coil chips 18 is formed on the upper shield layer 16 with the coil insulating foundation layer 17 interposed therebetween. The lower coil chip 18 is made of one or more kinds of metal materials selected from Au, Ag, Pt, Cu, Cr, Al, Ti, NiP, Mo, Pd, Rh, and Ni. Alternatively, the lower coil chip may be formed as a structure where the nonmagnetic metal materials are laminated.

A coil insulating layer 19 made of the inorganic insulating material such as $Al_2O_3$ or an organic insulating material such as a resist is formed in the vicinity of the lower coil chip 18.

The top surface of the insulating layer 19 is planarized and the coating foundation layer (not shown) is formed thereon, and the main magnetic pole layer 24 is provided on the coating foundation layer.

An insulating layer 32 made of $Al_2O_3$ or $SiO_2$ is buried in the vicinity of the main magnetic pole layer 24. Therefore, the top surface of the main magnetic pole layer 24 and the top surface of the insulating layer 32 are planarized to be a same face.

As shown in FIG. 3, the main magnetic pole layer 24 includes an elongated front portion 24a formed with a track width Tw in a height direction (Y direction shown in the drawing) from the opposed surface H1a of the recording medium (the opposed surface H1a is formed on a same surface as the opposed surface 10a of the slider 10) and a rear portion 24b formed having a track width (X direction shown in the drawing) larger than the front portion 24a in a height direction (Y direction shown in the drawing) at a rear side of the front end portion 24a. The maximum track width is T2 in the rear portion 24b.

The main magnetic pole layer 24 is coated with a ferromagnetic material and is formed of materials such as NiFe, C, Fe, and NiFeCo having high saturation magnetic flux density.

As shown in FIG. 1, the nonmagnetic gap layer 21 made of an inorganic material such as alumina or $SiO_2$ is formed on the main magnetic pole layer 24.

As shown in FIG. 1, an upper coil chip 23 is formed on the gap layer 21 with the coil insulating foundation layer 22 interposed therebetween. Because the gap layer 21 serves as the insulating foundation layer of the upper coil chip 23, the coil insulating foundation layer 22 may not be formed, but it is preferable that the coil insulating foundation layer 22 is formed. The plurality of upper coil chip 23 is formed of a conductive material similar to the lower coil chip 18. The upper coil chip 23 is formed of one or more kinds of metal materials selected from Au, Ag, Pt, Cu, Cr, Al, Ti, NiP, Mo, Pd, Rh, and Ni. Alternatively, the upper coil chip 23 may have a structure where the nonmagnetic metal materials are laminated.

The end portions in the track width direction (X direction shown in the drawing) of the lower coil chip 18 and the upper coil chip 23 are in electrical contact with each other to become a solenoid state as shown in FIG. 3. The lower coil chip 18 and the upper coil chip 23 each include withdrawing portions 18a and 23a. Current is supplied to the solenoidal coil from the withdrawing portions 18a and 23a.

A coil insulating layer 26 made of an inorganic insulating material such as $Al_2O_3$ or an organic insulating material such as a resist is formed on the upper coil chip 23. As embodiments shown in FIGS. 1 to 3, a separation adjustment insulating layer 28 made of an inorganic material or an organic material is formed on the gap layer 21. The front edge of the coil insulating layer 26 is overlapped with the separation adjustment insulating layer 28. As shown in FIG. 3, the front edge 28a of the separation adjustment insulating layer 28 extends linearly parallel to the track width direction (X direction shown in the drawing). The front edge 28a of the separation adjustment insulating layer 28 is separated from the opposed surface H1a by a predetermined distance (gap depth) L1 in the height direction. As shown in FIG. 3, the separation adjustment insulating layer 28 extends lengthily in the track width direction (X direction shown in the drawing). The width T3 of the front edge 28a of the separation adjustment insulating layer 28 is at least larger than the maximum width T2 of the main magnetic pole layer 24. It is preferable that the width T3 of the separation adjustment insulating layer 28 is substantially similar with the maximum width T4 of the coil insulating layer 26 formed in the height direction of the separation adjustment insulating layer. Because the track width of the upper coil chip 23 is typically larger than the maximum width T2 of the main magnetic pole layer 24 in the case of using a solenoid-shaped coil layer, the maximum width T4 of the coil insulating layer 26 covering the upper coil chip 23 is typically larger than the maximum width T2 of the main magnetic pole layer 24. The separation adjustment insulating layer 28 is made of the organic insulating material and is formed by thermal curing. A perpendicular section shape is changed to a substantially semi-elliptical shape (or at least the top surface 28b has a curved shape) shown in any one of FIG. 1 and FIG. 4 from a rectangular shape by a thermal treatment. The coil insulating layer 26 partially overlapped with the separation adjustment insulating layer 28 in the height direction also is made of the organic insulating material and is formed by the thermal curing. The top surface 26b in the opposed surface of the coil insulating layer 26 is formed convexly in the curved shape from the top surface 28b of the separation adjustment insulating layer 28. The separation adjustment insulating layer 28 and the coil insulating layer 26 (hereinafter, the two layers may be referred to as "insulating layer 30") is formed convexly in an upper direction (Z direction shown in the drawing) of a reference plane when the top surface of the gap layer 21 is defined as the reference plane. The top surface of the gap layer 20 is exposed in the vicinity of the insulating layer 30. Hereinafter, a region between the front edge 28a of the separation adjustment insulating layer 28 and the opposed surface H1a is referred to as a front region A (slant line region shown in FIG. 3 and opposed regions in the track width direction (X direction shown in the drawing) of the insulating layer 30 is referred to as the opposed regions B.

As shown in FIGS. 1, 3, and 4, a return yoke layer 27 made of a ferromagnetic material such as a permalloy is formed on the front region A, the insulating layer 30, and the opposed regions B. As shown in FIG. 1, the rear end portion in the height direction of the return yoke layer 27 is formed of a contact portion 27b being in magnetic contact with the main magnetic pole layer 24.

The return yoke layer 27 includes a center portion 27a and opposed end portions 27b positioned on the opposite sides of the track width direction (X direction shown in the drawing) of the center portion 27a. The center portion 27a is formed in a position opposed to the main magnetic pole layer 24 in the film thickness direction (Z direction shown in the drawing). As shown in FIGS. 1 to 4, a protrusion portion 27a1 which protrudes toward the upper side from the insulating layer 30 to the front region A is formed in the center portion 27a. Because the insulating layer 30, rather than the opposed regions B, is formed convexly, the return yoke layer 27 formed on the insulating layer 30 is formed convexly, unlike the return yoke layer 27 formed on the opposed regions B. The film thickness H3 (see FIG. 4) of the return yoke layer 27 formed on the insulating layer 30 and the thickness of the return yoke layer 27 formed on the opposed regions B are scarcely changed. Meanwhile, the top surface (top surface of the gap layer 21) of the front region A is a planarized plane positioned lower than the top surface of the insulating layer 30. At time of measuring the thickness of the return yoke layer 27 coated on the front region A from the insulating layer 30, the thickness of the return yoke layer 27 is converged to a constant film thickness H4. The film thicknesses of the center portion 27a and the opposed end portions 27b are almost constant in a part where the return yoke layer 27 is coated forwardly (opposed direction of the Y direction shown in the drawing) longer than the opposed surface H1a as shown by dashed lines of FIG. 4. That is, assumed that the opposed H1a and the front edge 28a of the insulating layer 30 are close to each other and the gap L1 of the front region A is narrowed, the protrusion portion 27a1 extending from the insulating layer 30 is formed on the return yoke layer 27 formed on the front region A due to coating uniformity. Therefore, the film thickness H1 of the center portion 27a is larger than the film thickness H2 of the opposed end portions 27b extending on the opposite sides of the track width direction of the center portion 27a (see FIGS. 2 and 4 mainly). As shown in FIGS. 2 and 4, H1 represents the maximum film thickness. For convenience of description, the film thicknesses of the opposed side end portion 27b are compared with the maximum film thickness H1 of the center portion 27a. However, in the exemplary embodiment, the film thickness in the track width direction of the entire center portion 27a is larger than the film thickness H2 of the opposed end portions 27b. The thickness of the center portion 27a formed on the front region A is larger than the thickness of the opposed end portions 27b. As shown in FIG. 2, the maximum width T1 of the protrusion portion 27a1 shown in the opposed surface H1a is even larger than the track width Tw.

As described above, because the front region A is formed of the planarized plane, the bottom surface of the return yoke layer 27 formed on the front region A is formed of the planarized plane. As shown in FIG. 2, the downside 27c of the return yoke layer 27 is formed linearly parallel to the track width direction (X direction shown in the drawing) in the opposed surface H1a.

The plane of the return yoke layer 27 has a substantially rectangular shape. As shown in FIG. 2, the width T4 in the track width direction of the return yoke layer 27 shown in the opposed surface H1a is even larger than the track width Tw of the main magnetic pole layer 24.

As shown in FIG. 1, the return yoke layer 27 is covered with a protective layer 31 made of the inorganic insulating material.

The exemplary embodiment will be described. As shown in FIG. 2, as viewed from the opposed surface H1a of the return yoke layer 27, the return yoke layer 27 includes the downside 27c formed linearly parallel to the track width direction (X direction shown in the drawing). The return yoke layer 27 also includes the center portion 27a. The maximum width T1 of the protrusion portion 27a1 of the center portion 27a, which protrudes upwardly in a position opposed to the main magnetic pole layer 24 in the film thickness direction (Z direction shown in the drawing), is larger than the track width Tw. The return yoke layer 27 also includes the opposed end portions 27b that extend on the opposite sides in the track width direction of the center portion 27a and have the film thickness smaller than the center portion 27a.

The magnetic flux θ1 concentrated on the front portion 24a of the main magnetic pole layer 24 is discharged to the recording medium M, passes through the hard film Ma and the soft film Mb of the recording medium M, and returns to the return yoke layer 27.

Then, the magnetic flux θ1 is opposed to the main magnetic pole layer 24 and returns mainly to the center portion 27a where the area extends in the opposed surface H1a. The maximum width T1 of the protrusion portion 27a1 formed in the center portion 27a is even larger than the track width Tw. The protrusion portion 27a1 protrudes upwardly, that is, the protrusion portion 27a1 protrudes in a direction away from the main magnetic pole layer 24. In addition, because the downside 27c of the return yoke layer 27 has a flat shape, the magnetic flux θ1, which returns to the return yoke layer 27, easily returns to the entire center portion 27a. Therefore, it is possible to avoid having the magnetic flux θ1 from partially returning to the center portion 27a. For example, when the protrusion portion 27a1 protrudes downwardly, that is, the protrusion portion 27a1 protrudes in a direction close to the main magnetic pole layer 24, the magnetic flux θ1 easily returns concentratively to the vicinity of the protrusion portion 27a1, thereby reaching the magnetic saturation. However, in the exemplary embodiment, the downside 27c is formed linearly parallel to the track width direction and the protrusion portion 27a1 protrudes upwardly. Accordingly, it is possible to secure a large return area in the center portion 27a close to the main magnetic pole layer 24 and prevent the magnetic flux θ1 from returning concentratively to only a specific part, thereby properly preventing the magnetic saturation from being generated in the return yoke layer 27. Therefore, it is possible to improve the recording ability. Furthermore, as shown in FIG. 2, the film thickness H2 of the opposed end portions 27b of the return yoke layer 27 is smaller than the film thickness H1 of the center portion 27a. The return yoke layer 27 does not entirely have a large film thickness. That is, the center portion 27a to which the magnetic flux θ1 returns is formed in the large film thickness H1 and the other location is formed in the small film thickness H2, thereby suppressing the generation of PTP (Pole Tip Protrusion) at the time of the recording operation. In the perpendicular magnetic recording head of the exemplary embodiment described above, it is possible to properly obtain both effects such as improvement of the recording ability and suppression of the PTP generation.

As described above, because the protrusion portion protruding upwardly is formed in the center portion and the film thicknesses in the opposed end portions of the center portion is smaller than the film thickness in the center portion, it is possible to suppress PTP (Pole Tip Protrusion) more effectively in comparison with the case that the thickness of the entire return yoke layer is uniformly large.

In addition, in the opposed surface, the protrusion portion having the maximum width T1 larger than the track width Tw by protruding upwardly is formed in a position opposed to the first magnetic layer in the film thickness direction, and the thickness of the center portion is larger than the film thicknesses of the opposed end portions. Because the downside of the return yoke layer is formed linearly parallel to the track width direction, the magnetic flux discharged from the main magnetic pole layer passes through the recording medium and returns to the center portion having a large film thickness and a large area. Furthermore, because the protrusion portion is formed upwardly, that is, in a direction away from the main magnetic pole layer (not formed in a direction close to the main magnetic pole layer), it is possible to form the center portion having a large return area in a part close to the main magnetic pole layer. Therefore, because the magnetic flux returns to the protrusion portion and the entire center portion dispersively, the magnetic saturation does not occur and it is possible to properly obtain the improvement of the recording ability.

As shown in FIG. 3, because the maximum width T1 of the protrusion portion 27a1 is substantially similar to the width T3 in the track width direction of the front edge 28a of the separation adjustment insulating layer 28, it is possible to adjust the maximum width T1 of the protrusion portion 27a1 by adjusting the width T3 of the separation adjustment insulating layer 28. It is preferable that the width T3 of the separation adjustment insulating layer 28 is larger than the maximum width T2 of the main magnetic pole layer 24. It is also preferable that the maximum width T1 of the protrusion portion 27a1 is larger than the maximum width T2 of the main magnetic pole layer 24. As a result, it is possible to extend the area of the center portion 27a exposed from the opposed surface H1a, thereby suppressing the magnetic saturation effectively.

The shape of the protrusion portion 27a1 exposed from the opposed surface H1a is substantially similar to the cross-section shape of the separation adjustment insulating layer 28. For example, when the upside 27a2 of the protrusion portion 27a1 has an elliptically curved shape, it is preferable that the top surfaces of the separation adjustment insulating 28 and the coil insulating layer 26 have the same shape as the upside 27a2. Because the phenomenon in the front region A described in FIG. 4 occurs in the vicinity of the separation adjustment insulating layer 28 and the coil insulating layer 26, it is easy to have the maximum width T1 of the protrusion portion 27a1 to be a little larger than the width T3. In FIG. 3, the front edge 28a of the separation adjustment insulating layer 28 is parallel to the track width direction (X direction in the drawing), but the front edge 28a of the separation adjustment insulating layer 28 may have the other shapes. For example, the front edge 28a of the separation adjustment insulating layer 28 may have a convexly curved shape protruding toward the opposed surface H1a. However, because it is possible to easily adjust the shape and the maximum width T1 of the protrusion portion 27a1 formed on the return yoke layer 27, it is preferable that front edge 28a is parallel to the track width direction (X direction shown in the drawing).

In the exemplary embodiment, because the protrusion portion 27a1 protrudes upwardly, it is possible to easily form the protrusion 27a1. Particularly, as described in a manufacturing method mentioned below, it is possible to easily and properly form the protrusion portion 27a1 on the return yoke layer 27 exposed from the opposed surface by adjusting the position where the front edge 28a of the insulating layer 30 is formed.

Figure 5:
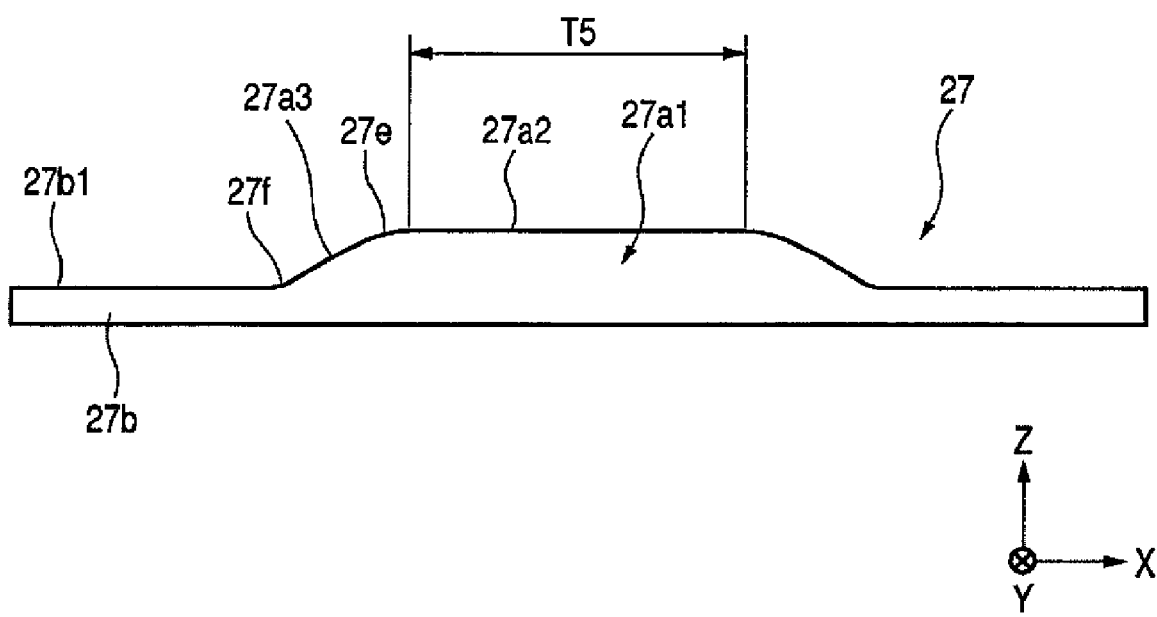
FIG. 5 is a front view of a return yoke layer different from the front view of the return yoke layer shown in FIG. 2.

As shown in FIG. 2, the upside 27a2 of the protrusion portion 27a1 has a semi-elliptically curved shape. The upper side 27b1 of the opposed end portions 27b is formed linearly extending in the direction parallel to the track width direction (X direction shown in the drawing). In addition, a location 27d where the upside 27a2 of the protrusion portion 27a1 and the upper side 27b1 of the opposed end portions 27b cross each other does not have an angular shape, but has an R shape. As described above, the downside 27c of the return yoke layer 27 shown in the opposed H1a is formed linearly extending in a direction parallel to the track width direction (X direction shown in the drawing). Accordingly, because the return yoke layer 27 does not have an angular-shape location in a region from the downside 27c to the upside 27a2 of the protrusion portion 27a1, it is possible to properly prevent an inconvenience such as the erasure of the data recorded in the recording medium M. The erasure is caused when the magnetic flux is discharged to the recording medium M from the return yoke layer 27, at the time of the nonrecording operation. The upside 27a2 of the protrusion portion 27a1 of the return yoke layer 27 is formed linearly parallel to the track width direction (X direction shown in the drawing) as shown in FIG. 5. A lateral side 27a3 inclined to increase the width of the protrusion gradually as going from the top to the bottom is provided between the upside 27a2 of the protrusion portion 27a1 and the upside 27b1 of the opposed end portions 27b. A location 27e, where the upside 27a2 and the lateral side 27a3 cross each other, and a location 27f, where the upside 27b2 and the lateral side 27a3 cross each other, do not have an angular shape but have the R shape. The width T5 of the upside 27a2 of the protrusion 27a1 shown in FIG. 5 is larger than the track width Tw. It is preferable that the width T5 is larger than the maximum width T2 of the main magnetic pole layer 24. As a result, because the area exposed from the opposed surface H1a of the center portion 27a increases, it is possible to properly obtain the improvement of the recording ability.

Figure 6:
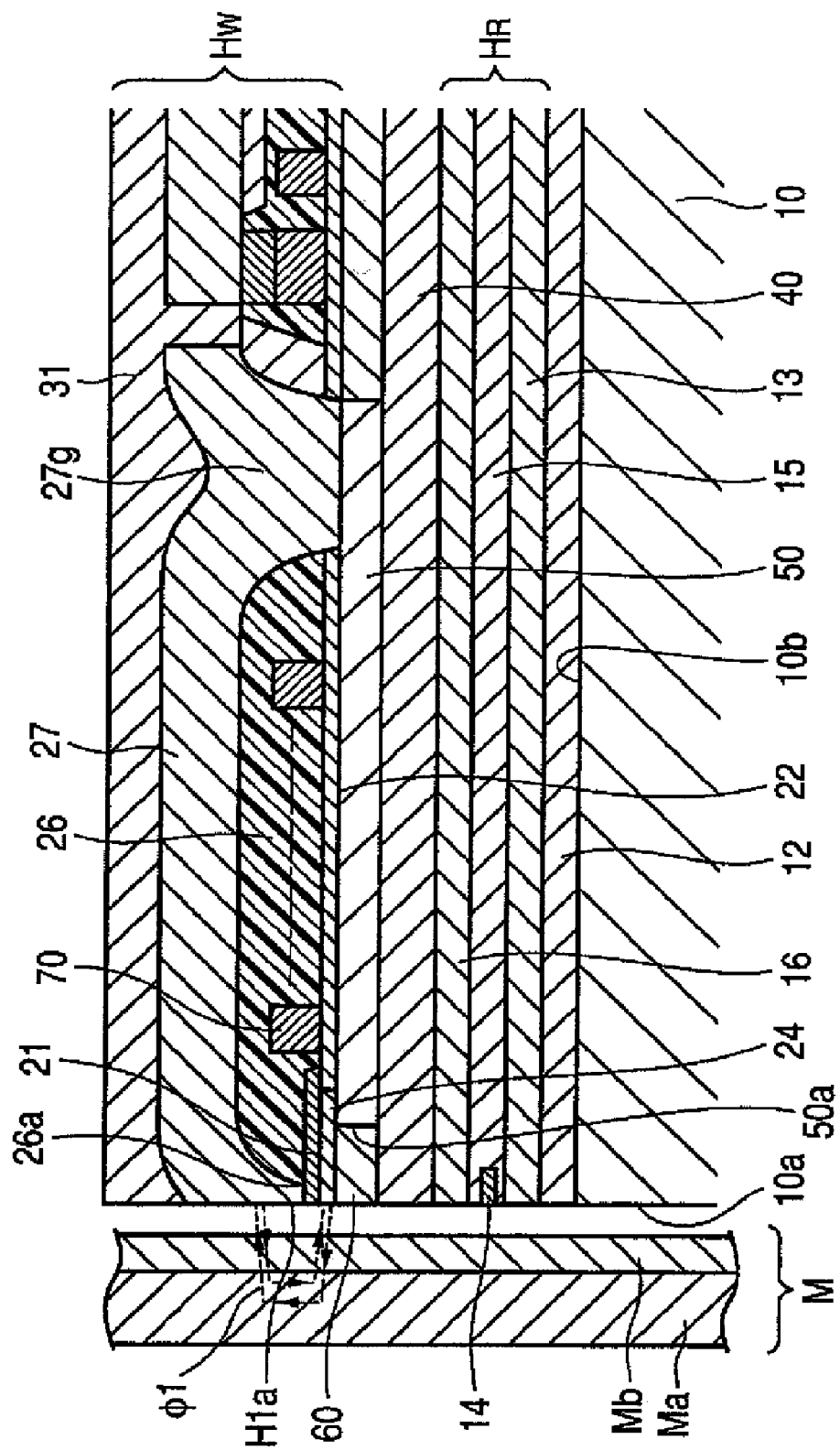
FIG. 6 is a perpendicular cross-sectional view of a magnetic head having a perpendicular magnetic recording head according to a second embodiment.
Figure 7:
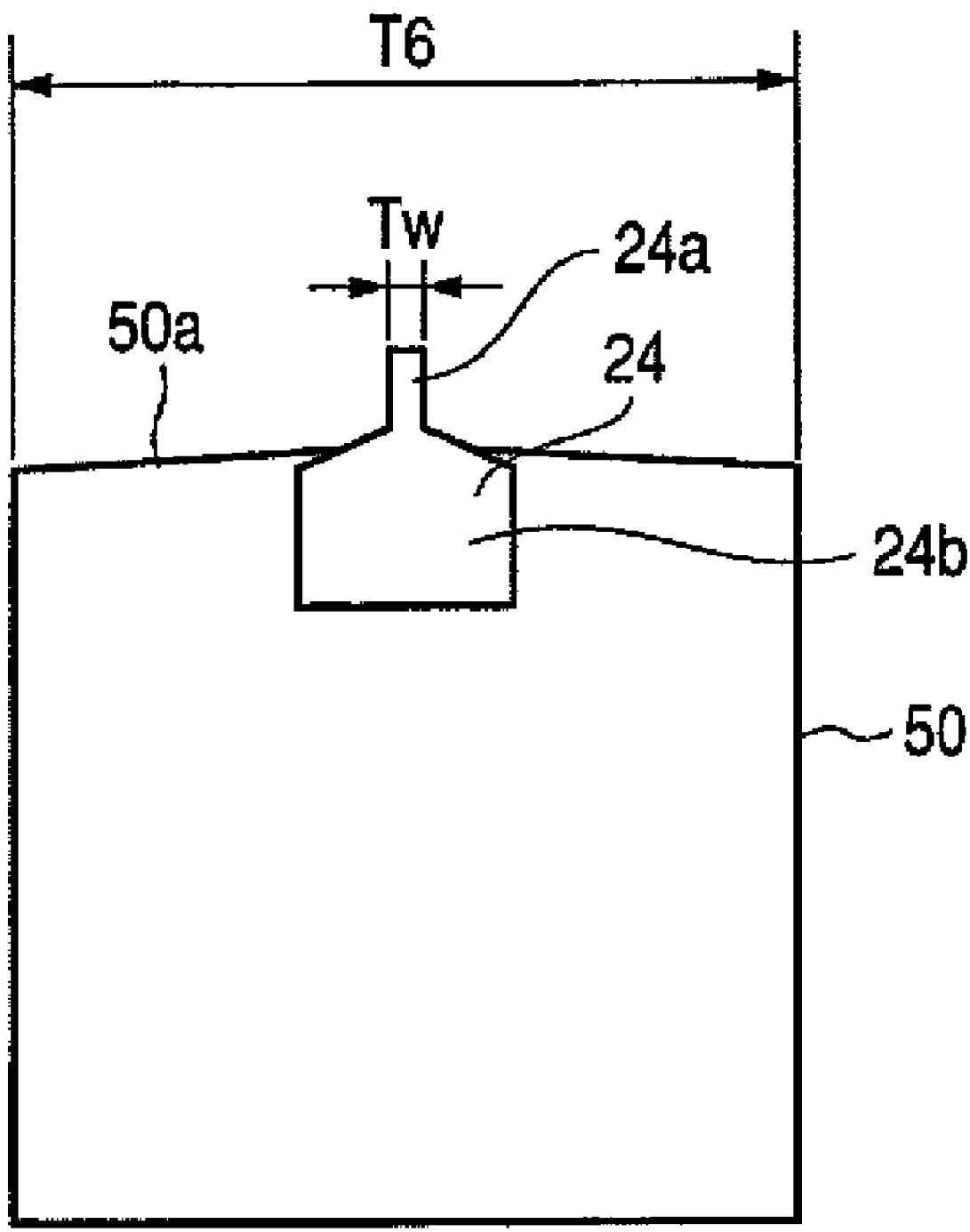
FIG. 7 is a fragmentary plan view of the perpendicular magnetic recording head shown in FIG. 6.

FIG. 6 is a perpendicular cross-sectional view of the perpendicular magnetic recording head having the perpendicular magnetic recording head of a second exemplary embodiment. FIG. 7 is a fragmentary plan view of the perpendicular magnetic recording head shown in FIG. 6. A layer to which a same reference numeral as the reference numeral of FIG. 1 is given represents a same layer as the layer of FIG. 1.

In the perpendicular magnetic recording head Hw shown in FIG. 6, the main magnetic pole layer 24 is provided only in the vicinity of the opposed surface H1a, unlike the perpendicular magnetic recording head shown in FIG. 1. The main magnetic pole layer 24 and the return yoke layer 27 are in contact with each other by a sub-yoke layer 50. In the exemplary embodiment shown in FIG. 6, the main magnetic pole layer 24 and the sub-yoke layer 50 serve as "a first magnetic layer". As shown in FIG. 7, the main magnetic pole layer 24 includes the elongated front portion 24a and the rear portion 24b having the width larger than the width of the front portion 24a similar to the main magnetic pole layer shown in FIG. 3. In addition, the sub-yoke layer 50 is overlapped with the rear portion 24b. The sub-yoke layer 50 has a substantially rectangular shape. The front end face 50a of the sub-yoke layer 50 is formed in a position retreated by a predetermined distance in the height direction (Y direction shown in the drawing) from the opposed surface H1a. As shown in FIG. 6, an insulating layer 60 is formed between the front end face of 50a of the sub-yoke layer 50 and the opposed surface H1a. The top surface of the insulating layer 60 and the face of the sub-yoke layer 50 are formed in the same planarized plane.

As shown in FIG. 6, the main magnetic pole layer 24 is formed on the insulating layer 60 and the sub-yoke layer 50. The coil insulating foundation layer 22 is formed in the rear of the height direction of the main magnetic pole layer 24. A coil layer 70 is formed on the coil insulating foundation layer 22. In the perpendicular magnetic recording head shown in FIG. 1, the solenoid-shaped coil layer is formed therein, but the coil layer 70 is a planar coil spirally formed in the vicinity of the a contact portion 27g of the return yoke layer 27 in FIG. 6. The coil insulating layer 26 is formed on the coil layer 70 and the return yoke layer 27 is formed on the coil insulating layer 26. A separation layer 40 made of an insulating material is formed between the sub-yoke layer 50 and the insulating barrier layer 60 and the upper shield layer 16.

In the exemplary embodiment shown in FIG. 6, the separation adjustment insulating layer 28 is not provided unlike the exemplary embodiment shown in FIG. 1. In the exemplary embodiment shown in FIGS. 1 and 3, the front edge 28a of the separation adjustment insulating layer 28 is disposed in the vicinity of the opposed surface H1a and the gap L1. The gap L1 is between the opposed surface H1a and the front edge 28a and is adjusted. As a result, the protrusion portion 27a1 is formed as the shape of the opposed surface of the return yoke layer 27. On the other hand, in the exemplary embodiment shown in FIG. 6, because the separation adjustment insulating layer 29 is not formed, the front edge 26a of the coil insulating layer 26 is disposed closer to the opposed surface H1a than in the exemplary embodiment shown in FIGS. 1 and 3. The gap L1 between the front edge 26a of the coil insulating layer 26 and the opposed H1a is adjusted. Therefore, the protrusion portion 27a1 is properly formed as the shape of the opposed surface of the return yoke layer 27. For example, in the exemplary embodiment shown in FIG. 6, the coil insulating layer 26 itself serves as the separation adjustment insulating layer.

As shown in FIG. 7, it is preferable that the maximum width in the track width direction (X direction shown in the drawing) of the sub-yoke layer 50 is formed in T6 and the maximum width T1 of the protrusion portion 27a1 exposed from the opposed surface H1a of the return yoke layer 27 is larger than the maximum width T6 of the sub-yoke layer 50.

In the exemplary embodiments shown in FIGS. 6 and 7, the opposed surface H1a of the return yoke layer 27 includes the downside 27c formed linearly parallel to the track width direction (X direction shown in the drawing), the center portion 27a where the maximum width of the protrusion portion 27a1 that protrudes upwardly in a position opposed to the main magnetic pole layer 24 in the film thickness direction (Z direction shown in the drawing) is larger than the track width Tw, and the opposed end portions 27b. The opposed end portions 27b extend on the opposite sides in the track width direction of the center portion 27a and have the film thickness smaller than the center portion 27a.

The magnetic flux θ1 concentrated on the front portion 24a of the main magnetic pole layer 24 is discharged to the recording medium M, passes through the hard film Ma and the soft film Mb of the recording medium M, and returns to the return yoke layer 27.

The maximum width T1 of the protrusion portion 27a1 exposed from the opposed surface H1a is even larger than the track width Tw. The protrusion portion 27a1 protrudes upwardly, that is, the protrusion portion 27a1 protrudes in a direction away from the main magnetic pole layer 24. In addition, because the downside 27c of the return yoke layer 27 has a flat shape, the magnetic flux θ1 that returns to the return yoke layer 27 easily returns to the entire center portion 27a having a large area properly. Therefore, it is possible to properly prevent the magnetic saturation from being generated in the return yoke layer 27. Accordingly, it is possible to improve the recording ability. Moreover, as shown in FIG. 2, the film thickness H2 of the opposed end portions 27b of the return yoke layer 27 is smaller than the film thickness H1 of the center portion 27a. The return yoke layer 27 does not entirely have a large film thickness. For example, the center portion 27a having a large film thickness H1 is formed in a position opposed to the main magnetic pole layer 24 to which the magnetic flux θ1 returns in the film thickness direction and the other location is formed in the small film thickness H2, thereby suppressing the generation of PTP (Pole Tip Protrusion) at the time of the recording operation. In the perpendicular magnetic recording head of the exemplary embodiment described above, it is possible to properly obtain both effects such as improvement of the recording ability and suppression of the PTP generation.

As discussed above in regards to the exemplary embodiments, it is possible to easily and properly form the return yoke layer having the protrusion portion protruding in the center portion and the opposed surface where the thickness of the center portion is larger than the film thicknesses of the opposed end portions. It is also possible to form the larger area of the opposed surface of the center portion and suppress the generation of the magnetic saturation, thereby properly obtaining the improvement of the recording ability.

Furthermore, as described above, because an angular portion is not formed in the upside of the protrusion portion, it is possible to properly suppress a problem such as an erasure of data recorded in the recording medium caused when the magnetic flux is discharged from the return yoke layer in a non-recording operation. Sizes will now be described. It is preferable that the maximum width T1 of the protrusion portion 27a1 is in the range of 1 μm to 100 μm, the width T4 of the return yoke layer 27 is in the range of 10 μm to 150 μm, the maximum width T2 of the main magnetic pole layer 24 or the maximum width T6 of the sub-yoke layer 50 is in the range of 5 μm to 100 μm, the track width Tw is in the range of 0.05 μm to 0.5 μm, the gap L1 of the front region A is in the range of 0 μm to 0.3 μm, the film thickness H1 of the center portion 27a (maximum film thickness) is in the range of 0.5 μm to 5 μm, the film thickness H2 of the opposed end portions 27b is in the range of 0.1 μm to 5 μm, and the maximum width T2 of the main magnetic pole layer 24 is in the range of 0.05 μm to 0.5 μm.

Figure 8:
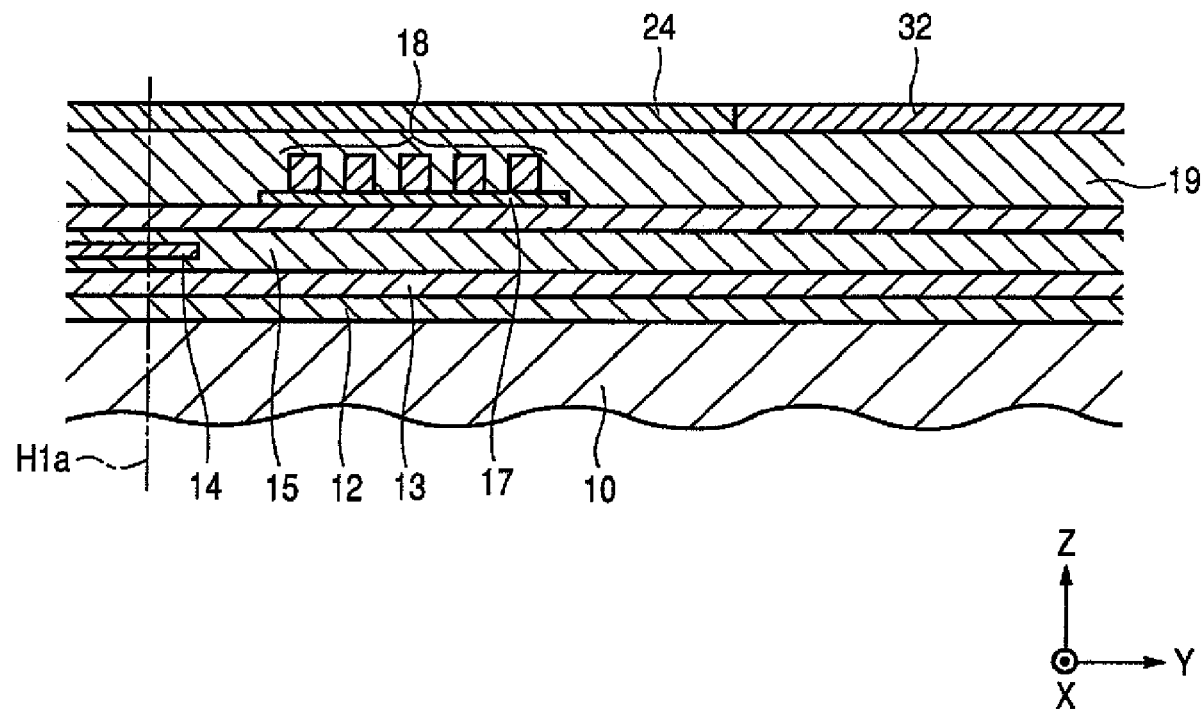
FIG. 8 is a process view showing a method of manufacturing the perpendicular magnetic recording head shown in FIG. 1 and a perpendicular cross-sectional view of the perpendicular magnetic recording head during a manufacturing process.
Figure 9:
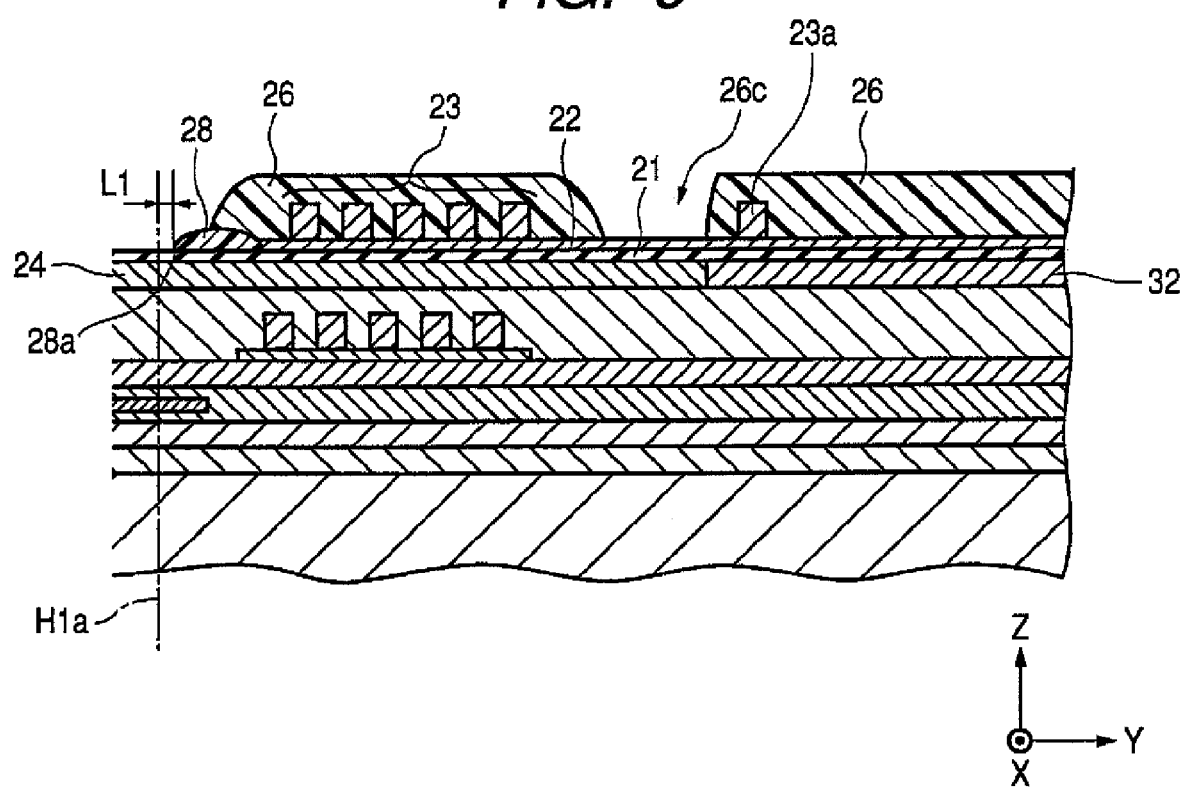
FIG. 9 is a process view followed by the process shown in FIG. 8 and a perpendicular cross-sectional view of the perpendicular magnetic recording head during a manufacturing process.
Figure 10:
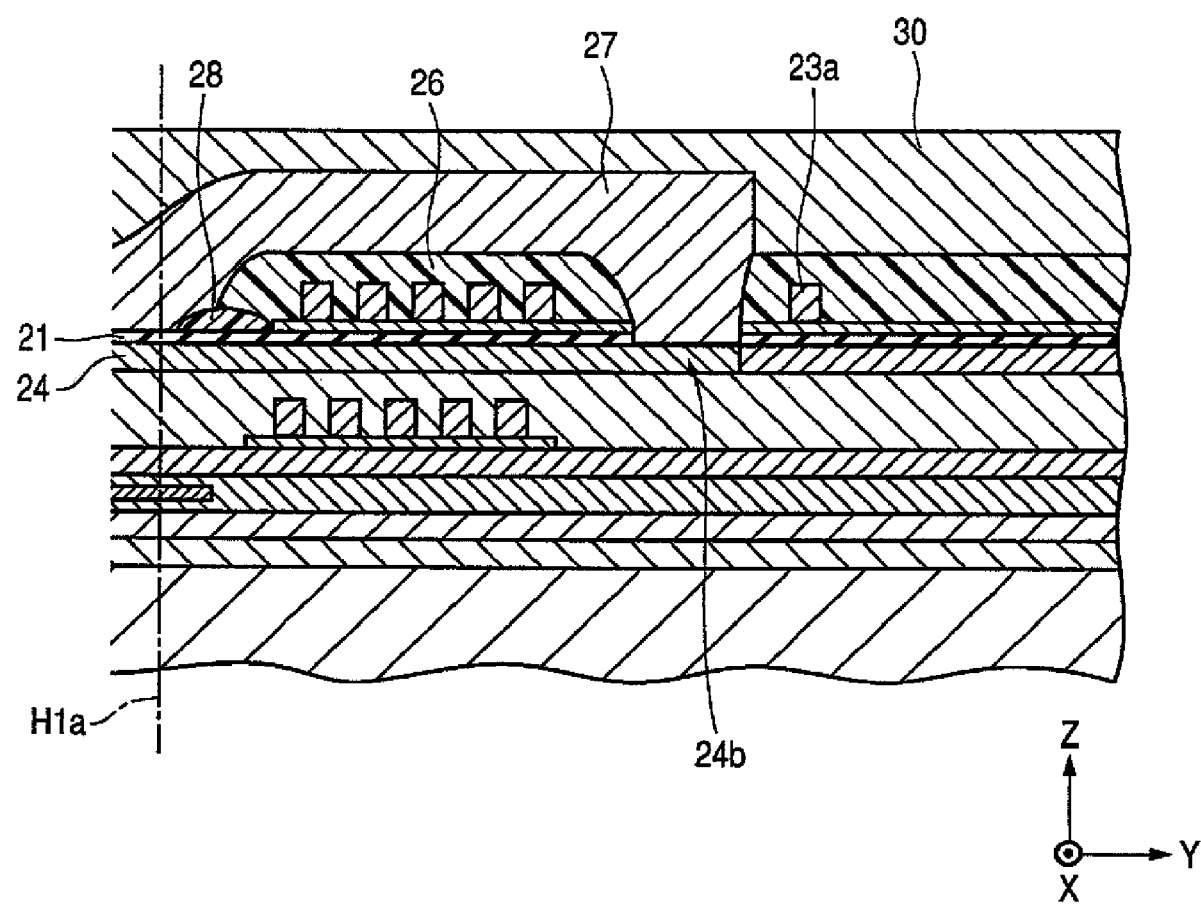
FIG. 10 is a process view followed by the process shown in FIG. 9 and a cross-sectional view of the perpendicular magnetic recording head during a manufacturing process.

FIGS. 8 to 10 are process views showing a method of manufacturing the perpendicular magnetic recording head shown in FIG. 1. In addition, FIGS. 8 to 10 are perpendicular cross-sectional views of the perpendicular magnetic recording head during the manufacturing process.

Dashed lines shown in FIGS. 8 to 10 represent a face to become the opposed surface H1a later. A face shown by cutting along the dashed lines becomes the opposed surface H1a. In manufacturing the magnetic head, each layer is deposited extensively to the front side of the face to become the opposed surface H1a. Each layer on the front side is excluded.

In the process shown in FIG. 8, the main magnetic pole layer 24 is deposited on the coil insulating layer 19 covering the lower coil chip 13 by coating. The main magnetic pole layer 24 includes the front portion 24a and the rear portion 24b shown in FIG. 3. Then, the front portion 24a is extended to the front side of the opposed surface H1a.

The insulating layer 32 is formed on the main magnetic pole layer 24. The vicinity of the main magnetic pole layer 24 and the insulating layer 32 is polishing-processed by using a CMP technology until the top surface of the magnetic pole layer 24 and the top surface of the insulating layer 32 become a same plane.

In the process shown in FIG. 9, the gap layer 21 is formed on the main magnetic pole layer 24 and the insulating layer 32 by sputtering. In addition, the coil insulating foundation layer 22 is formed on the gap layer 21. The upper coil chip 23 is formed on the coil insulating foundation layer 22. A contact layer (not shown) that contacts the upper coil chip 23 with the lower coil chip 18 is formed in the coil insulating layer 19 and the insulating layer 32 in advance. The upper coil chip 23 and the lower coil chip 18 are in contact with each other with the contact layer interposed therebetween. Therefore, the solenoid-shaped coil is formed.

As shown in FIG. 9, the separation adjustment insulating layer 28 is formed on the gap layer 21 positioned in the front of the upper coil chip 23. Then, the front edge 28a of the separation adjustment insulating layer 28 is retreated in the height direction (Y direction shown in the drawing) from the opposed surface H1a. In the next process, the gap L1 between the front edge 28a of the separation adjustment insulating layer 28 and the opposed surface H1a is adjusted so that the protrusion portion 27a1 is formed on the center portion 27a of the return yoke layer 27. The film thickness in the center portion 27a is formed with a film thickness larger than the opposed end portions 27b formed on the opposite sides of the track width direction of the center portion 27a in the front region A of the separation adjustment insulating layer 28. The front region A, where the top surface of the gap layer 21 is exposed in the planarized plane, is formed in the front of the separation adjustment insulating layer 28.

Next, the coil insulating layer 26 is formed from the rear of the front edge 28a of the separation adjustment insulating layer 28 in the height direction. In regards to the perpendicular magnetic recording head shown in FIG. 6, the coil insulating layer 26 serves as the separation adjustment insulating layer. Therefore, the gap L1 between the front edge 26a of the coil insulating layer 26 and the opposed surface H1a is properly adjusted. As shown in FIG. 9, a hole portion 26c is formed in a position where the contact portion 27g of the return yoke layer 27 is formed, on the coil insulating layer 26. In addition, the rear portion 24b of the main magnetic pole layer 24 is exposed by removing the coil insulating foundation layer 22 and the gap layer 21 exposed from the hole portion 26c by etching.

As shown in FIG. 3, in the process shown in FIG. 10, the return yoke layer 27 is formed on the separation adjustment insulating layer 28, the coil insulating layer 26, the opposed regions B extending to both the separation adjustment insulating layer 28 and the coil insulating layer 26, and the rear portion 24b of the main magnetic pole layer 24 from the gap layer 21 exposed to the front region A by a frame coating operation.

Because the coil insulating layer 26 and the separation adjustment insulating layer 28 are convexed in the upper side of the other faces formed on the return yoke layer 27, the return yoke layer 27 formed on the coil insulating layer 26 and the separation adjustment insulating layer 28 is protruded to the upper side of the return yoke layer 27 formed on the opposed regions B.

Meanwhile, the protrusion portion 27a1 of the return yoke layer 27 formed on the coil insulating layer 26 and the separation adjustment insulating layer 28 extends to the opposed surface H1a due to the coating uniformity, and the protrusion portion becomes smaller gradually in the front of the opposed surface H1a as described in FIG. 4. Consequently, the top surface of the return yoke layer 27 is planarized. Assuming that the magnetic head is cut along the dashed lines shown in FIG. 10, the cut face becomes the opposed surface H1a. The return yoke layer 27 is exposed from the opposed surface H1a. The return yoke layer 27 includes the downside 27c formed linearly parallel to the track width direction as shown in FIG. 2, the center portion 27a, where the protrusion portion 27a1 having the maximum width T1 larger than the track width Tw protrudes to the upper side of the position opposed to the main magnetic pole layer 24 in the film thickness direction, and the opposed end portions 27b, having the film thickness smaller than the center portion 27a, that extend on the opposite sides in the track width direction of the center portion 27a.

In the method manufacturing the perpendicular magnetic recording head shown in FIGS. 8 to 10, the front edge 28a of the separation adjustment insulating layer 28 is close to the opposed surface H1a and the protrusion portion of the return yoke layer 27 formed through the separation adjustment insulating layer 28 from the coil insulating layer 26 extends at least to the front region A in a position to become the opposed surface H1a. As a result, it is possible to easily and properly expose the return yoke layer 27 having the protrusion portion 27a1 to the opposed surface H1a.

As described in the exemplary embodiment, in the case in which the protrusion portion 27a1 is formed upwardly, it is possible to form the protrusion portion 27a1 by using the separation adjustment insulating layer 28 or the coil insulating layer 26. Therefore, it is possible to easily and properly form the protrusion portion 27a1.

The gap L1 between the front edge of the insulating layer and the opposed surface may be adjusted. Specifically, the front edge of the insulating layer is formed on the opposed surface closer than in related art. As described above, assuming that the return yoke layer is formed from the front region to the insulating layer, it is possible to extend the protrusion portion of the return yoke layer formed on the insulating layer and to easily and properly form the thickness of the center portion larger than the film thicknesses of the opposed end portions in the opposed surface by adjusting a position where the front edge of the insulating layer is formed. In addition, it is possible to adjust the maximum width T1 of the return yoke layer 27 to the width T3 of the front edge 28a of the separation adjustment insulating layer 28. Particularly, when the solenoid-shaped coil is formed, it is preferable to form the insulating layer having the width larger than the maximum width T2 of the main magnetic pole layer 24. Accordingly, it is possible to easily and properly form the return yoke layer 27 including the protrusion 27a1 having the maximum width T1 larger than the maximum width T2 of the main magnetic pole layer 24 in the opposed surface H1a.

It is intended that the foregoing detailed description be regarded as illustrative rather than limiting, and that it be understood that the following claims, including all equivalents, are intended to define the scope of this invention.

What is claimed is:

1. A perpendicular magnetic recording head, comprising:
  a first magnetic layer having a main magnetic pole exposed from a surface opposed to a recording medium in a track width Tw;
  a return yoke layer opposed to the first magnetic layer with a nonmagnetic layer interposed therebetween on the opposed surface; and
  a coil layer for applying a recording magnetic field to the first magnetic layer and the return yoke layer,
  wherein the return yoke layer on the opposed surface includes a center portion provided in a position opposed to the first magnetic layer in a film thickness direction, and opposed end portions extending on opposite sides in the track width direction of the center portion and having a film thickness smaller than the center portion, and
  wherein a downside of the center portion and the opposed end portions is formed continuously and linearly parallel to the track width direction, the downside being located facing to the first magnetic layer, and an upside of the center portion includes a protrusion portion protruding upwardly and having a maximum width T1 larger than the track width Tw to have the opposed end portions.

2. The perpendicular magnetic recording head according to claim 1, wherein an insulating layer having at least a coil insulating layer covering the coil layer, which protrudes upwardly, is provided in the rear of the opposed surface in a height direction between the first magnetic layer and the return yoke layer,
  wherein the top surface of the nonmagnetic layer is formed as a planarized plane in a front region from the front edge of the insulating layer to the opposed surface,
  wherein the protrusion portion of the return yoke layer is formed from the insulating layer to the front region, and
  wherein the bottom surface of the return yoke layer is formed as a planarized plane and the thickness of the center portion is larger than the film thicknesses of the opposed end portions at least in the front region.

3. The perpendicular magnetic recording head according to claim 1, wherein the maximum width T1 of the protrusion portion is larger than the maximum width of the first magnetic layer.

4. The perpendicular magnetic recording head according to claim 1, wherein the upside of the protrusion portion on the opposed surface has a curved shape.

5. A method of manufacturing a perpendicular magnetic recording head including a first magnetic layer having a main magnetic pole exposed from a surface opposed to a recording medium in a track width Tw, a return yoke layer opposed to the first magnetic layer with a nonmagnetic layer interposed therebetween, and a coil layer for applying a recording magnetic field to the first magnetic layer and the return yoke layer, the method comprising the steps of:

(a) forming the nonmagnetic layer on the first magnetic layer and forming the coil layer;

(b) protruding the insulating layer, including at least a coil insulating layer covering the coil layer, upwardly on the nonmagnetic layer and retreating the insulating layer in a height direction, wherein a protrusion is formed in a center portion of the return yoke layer, a gap L1 between the anterior of the insulating layer and the opposed surface is adjusted so that the film thickness in the center portion of the return yoke layer is larger than the film thickness in opposite sides formed in the track width direction of the center portion in the front region of the insulating layer, and the front region where the top surface of the nonmagnetic layer is exposed in a planarized plane is formed in the front of the insulating layer, and (c) exposing the return yoke layer by forming the return yoke layer through the insulating layer from the front region, wherein the return yoke layer includes a center portion provided in a position opposed to the first magnetic layer in the film thickness direction, and opposed end portions, having the film thickness smaller than the center portion, that extend on the opposite sides in the track width direction of the center portion, and wherein a downside of the center portion and the opposed end portions is formed continuously and linearly parallel to the track width direction from the opposed surface, the downside being located facing to the first magnetic layer, and an upside of the center portion includes a protrusion portion protruding upwardly and having a maximum width T1 larger than the track width Tw to have the opposed end portions.

* * * * *